United States Patent
Haque et al.

(10) Patent No.: US 10,489,567 B2
(45) Date of Patent: Nov. 26, 2019

(54) ACCESSIBLE SECURE DATA ENTRY

(71) Applicants: Zeeshanul Haque, Kolkata (IN); Rakesh Ramamurthy, Bangalore (IN)

(72) Inventors: Zeeshanul Haque, Kolkata (IN); Rakesh Ramamurthy, Bangalore (IN)

(73) Assignee: Visa International Service Association, San Francisco, CA (US)

( * ) Notice: Subject to any disclaimer, the term of this patent is extended or adjusted under 35 U.S.C. 154(b) by 252 days.

(21) Appl. No.: 15/606,466

(22) Filed: May 26, 2017

(65) Prior Publication Data
US 2018/0341757 A1    Nov. 29, 2018

(51) Int. Cl.
| | |
|---|---|
| G06F 21/31 | (2013.01) |
| G06F 3/01 | (2006.01) |
| G06F 3/041 | (2006.01) |
| G09B 21/00 | (2006.01) |
| G06F 3/0488 | (2013.01) |

(52) U.S. Cl.
CPC ............ G06F 21/316 (2013.01); G06F 3/016 (2013.01); G06F 3/0414 (2013.01); G06F 3/0488 (2013.01); G06F 21/31 (2013.01); G09B 21/003 (2013.01)

(58) Field of Classification Search
CPC .......... G06F 21/32; G06F 21/34; G06F 21/46; H04L 9/0643; H04L 9/0852; H04L 9/0863; H04L 9/0866
See application file for complete search history.

(56) References Cited

U.S. PATENT DOCUMENTS

| | | | |
|---|---|---|---|
| 2006/0107063 A1* | 5/2006 | Fiske | G06F 21/32 713/184 |
| 2007/0046627 A1* | 3/2007 | Soh | G06F 3/016 345/156 |
| 2011/0102326 A1* | 5/2011 | Casparian | G06F 3/016 345/168 |

* cited by examiner

*Primary Examiner* — Shaheda A Abdin
(74) *Attorney, Agent, or Firm* — Loeb & Loeb LLP

(57) ABSTRACT

A user, particularly a user with a visual impairment, enters a security code or PIN via a touchscreen using different levels of pressure for predetermined count times. The ability to enter the entire PIN without lifting the user's finger or stylus from the touchscreen helps to prevent the user's PIN from being compromised by a bystander. A haptic feedback device may be used to aid the user to count out the correct number for each of the digits of the PIN without visual or audio feedback that may be intercepted by another party.

13 Claims, 4 Drawing Sheets

ACCESSIBLE SECURE DATA ENTRY

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Many accommodations are available for those users who prefer to interact differently with a personal device such as a smartphone or tablet. For example, there are applications (apps) that can assist non-verbal users to build sentences, audio GPS to assist blind users when walking, voice control of the device, and more. However, access to financial systems requires more security than is available through currently available assistive apps.

SUMMARY

In an embodiment, an assistive technology allows a visually impaired user or any user in a compromised environment to securely enter a personal identification number (PIN) by applying different levels of pressure to a touch-sensitive screen. Upon reaching a point in an application where the PIN or password is required, the user merely applies a first pressure level to the screen to activate a counter that counts up at an interval, of for example, two seconds. When the number of intervals corresponding to the first digit of the PIN is reached, the user changes the pressure level to a second pressure level which resets and restarts the counter. This is repeated to enter successive digits until the pressure on the screen is removed, which captures the final digit and enters the PIN digits into the application requiring the PIN.

BRIEF DESCRIPTION OF THE DRAWINGS

The figures depict a preferred embodiment for purposes of illustration only. One skilled in the art may readily recognize from the following discussion that alternative embodiments of the structures and methods illustrated herein may be employed without departing from the principles described herein.

DETAILED DESCRIPTION

Passwords, passcodes, and personal identification numbers (PINs), are commonly used to access certain on-line accounts or to enable access to a device, such as a smartphone or tablet. For the sake of simplicity, the following discussion refers to all such identifiers as PINs, even though, as discussed below, the techniques involved support different length identifiers and may be used to support alpha character entry as well. Entering such an identifier usually involves entering a series of characters on a display or keypad. While different interactions require different levels of security, one fundamental element of secure access is keeping the PIN private. This may be a problem for users in crowded environments or for users who may have a visual impairment. For example, at a concert, subway, or other public forum, it may be difficult or impossible to enter a PIN without being observed by a bystander. The problem may be compounded when the user is visually impaired. For such a user, interacting via voice command or an oversized keypad may simply not be possible without the risk of exposing the PIN to a bystander.

Some applications, for example, an automated teller machine, may have Braille markings that allow a user with restricted vision to interact with the device and offers some protection from observation. In other applications, a user may be at home or in an environment where voice recognition or other assistive technologies may aid in the entry of a PIN. But in many environments, the use of those assistive technologies may not be possible without divulging the PIN to someone nearby.

As disclosed below, a smartphone or touchpad with a multi-level pressure sensitive touchscreen may be used to enter characters, particularly numerical digits, by alternating pressure levels on the screen to enter digits on a timed basis. The technique allows a user to enter a PIN without removing his or her finger or stylus from the touchscreen and does not require that any indicia appear on the screen, such as a numeric keypad that can be observed or recorded. A counter may be used to time the duration of alternating levels of pressure to determine the digits being captured. Haptic feedback from, for example, a vibrator, may assist the user in keeping track of the count. However, even if the haptic device creates some audible level of sound, since an observer may not know when the pressure change occurred no information is necessarily revealed.

Figure 1:
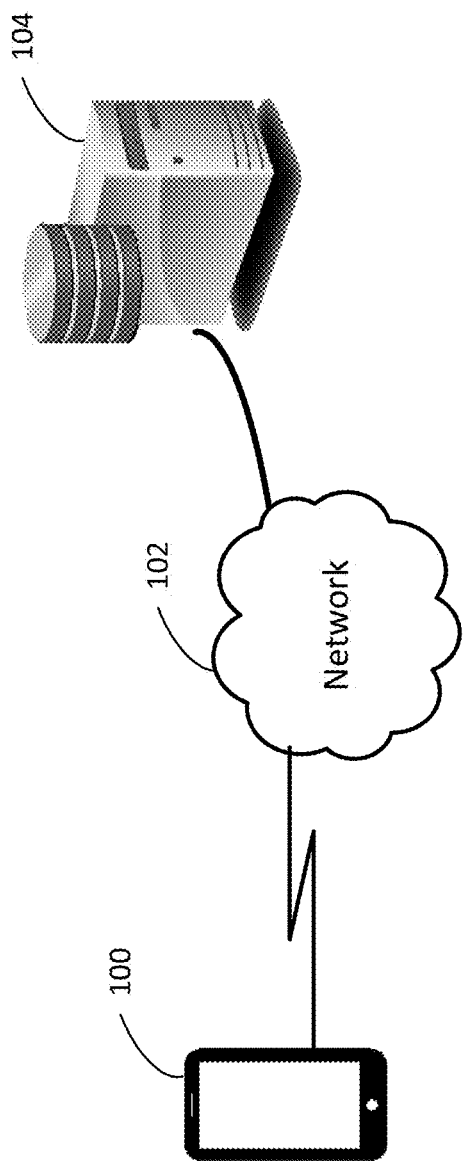
FIG. 1 is a block diagram of a system that may use a personal identification number in accordance with the current disclosure.

FIG. 1 is a block diagram of a system that may use a personal identification number or similar passcode. A device 100, such as a smartphone or tablet, may be connected via a network 102 with a server 104. The device 100 may connect to the network 102 via a wired or wireless connection. Exemplary wireless connections may include WiFi, Bluetooth, Zigbee, or others. The network 102 may simply be the Internet or may be a private network or carrier-supplied connection. The server 104 may host any of a number of applications that require entry of a PIN or other passcode. When the PIN is supplied to the server 104, the PIN may be hashed by a trusted application on the device 100 prior to transmission to the server 104, as discussed in more detail below. However, in other embodiments, the requirement for the PIN may simply be restricted to the device 100 itself. For example, the PIN may be required to unlock the device or gain access to a secure area of the device 100.

Figure 2:
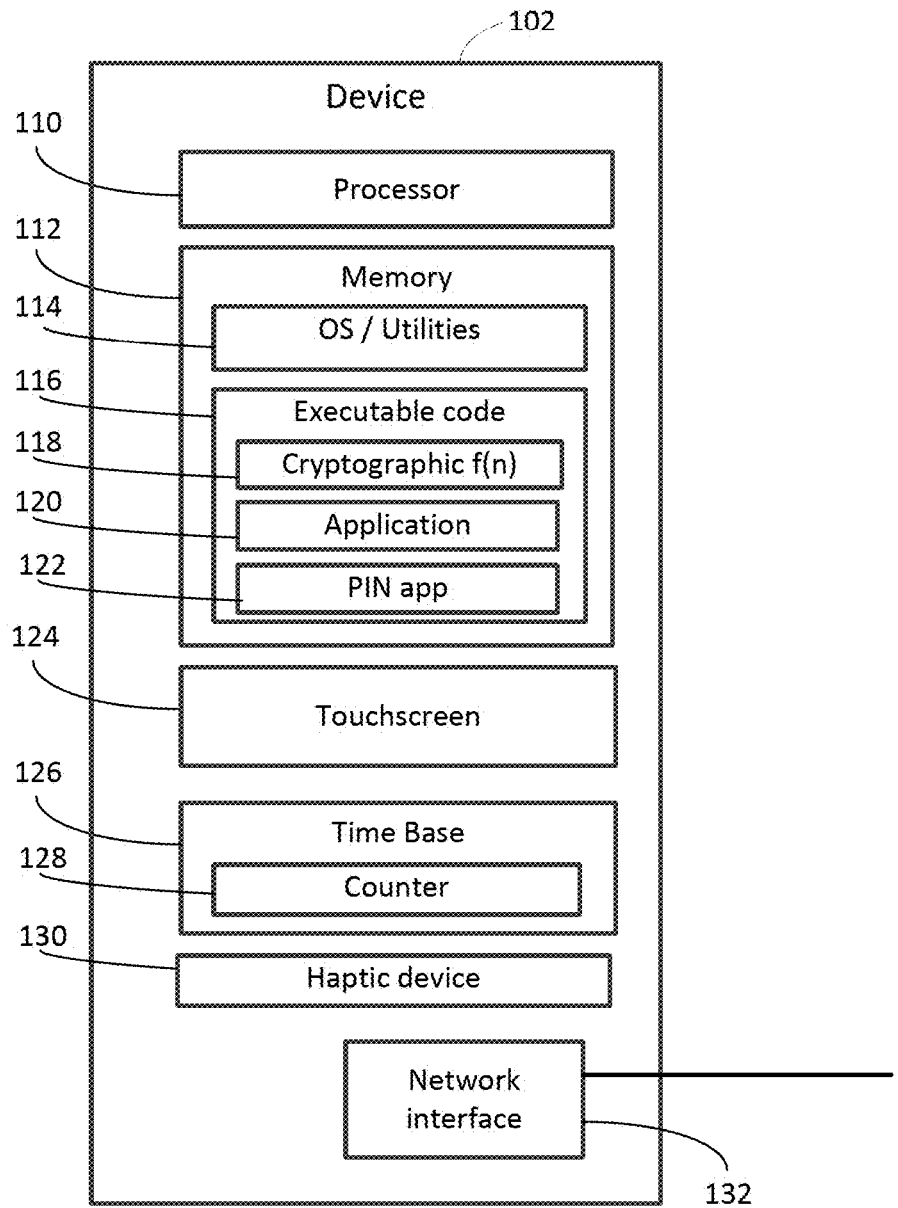
FIG. 2 is a block diagram of an exemplary device that supports personal identification number entry in accordance with the current disclosure.

A block diagram of a device 100 supporting accessible secure data entry may be illustrated in FIG. 2. The device 100 may be a smartphone, tablet, digital assistant, or other equipment that may require entry of a secure PIN or passcode. The device 100 may include a processor 110 and memory 112. The processor 110 may be any of several known processors suitable for use in personal devices and may include Qualcomm Snapdragon, Apple A series, and Intel Atom processors, among many others. The memory may be any physical memory suitable to the environment and performance requirements of the device 100 and includes physical memories such as RAM, ROM, flash memory, etc., but does not include carrier wave or propagated media-type memories.

The memory 112 may include an operating system and utilities 114 that include executable instructions used by the processor to support fundamental operations of the device 100 such as booting, file management, communications, settings, etc. The memory 112 may also include other executable code 116 such as cryptographic functions 118 and one or more applications 120 that require a PIN for access or operation. Such applications may include secure storage, secure access to a private network or virtual private network (VPN), an alarm or personal tracking system, a health application, or other applications that may generate, use, or store private information.

A PIN application 122 may be a standalone program accessible via an application program interface (API) that is exposed to other applications 120 for use in capturing a PIN. In other embodiments, the computer executable instruction for the PIN application may be embodied on a purpose built processor. In yet another embodiment, the PIN computer executable instructions may be physically embodied as part of a processor that may have a plurality of modules. The PIN application 122 may include a routine (not depicted) that supports ad hoc secure channel establishment so that a PIN captured by the PIN application 122 may be securely passed to the application 120. For example, the PIN application 122 may support a Diffie-Hellman key exchange that creates a unique session key for encrypting communication either internally with an application 120 or externally with the server 104 via a network interface 132. In another embodiment, the PIN application 122 may simple be an object or module that is included in an application 120 so that no external calls are required for the application 120 to capture a PIN value.

A touchscreen 124 may support a user interface including display of data to a user and receipt of input information from a user. The touchscreen 124 may support graphical input/output including a soft keyboard than can be used for typing alphanumeric characters. While the touchscreen 124 may be a primary interface point for a user, other input and output capabilities may be present, including a camera, speaker, and individual hardware buttons that may be reconfigurable based on program context.

In an embodiment, the touchscreen may be sensitive to a level of pressure applied to the touchscreen 124. That is, the touchscreen may be able to sense between a light pressure and a heavy pressure on the touch screen. In another embodiment, the touchscreen 124 may be able to sense contact with the touchscreen 124 and "hovering" over the touchscreen 124, that is, having the ability to sense a finger or stylus just above the surface of the touchscreen 124. The use of the application of different pressures on the touchscreen 124 to capture PIN data is discussed more below.

Logically, the various pressure levels may be set by the user. For example, a first user may have a very heavy touch and what that user considers a light touch may be considered a heavy touch by another user. Thus, the user may be able to define the touch levels through a series of user interfaces where a user is asked for a hard touch, for a soft touch, etc. The touch levels may be scored and stored in a memory and at input, the level of touch may be compared to the levels in the memory. Further, the touch levels may vary based on the various users, the time of day, the day of the week, etc., all of which may be adjustable by a user.

In another aspect, the system may continually update stored pressure levels for light and heavy taps over time using a learning algorithm. For example, a user may begin a PIN with three heavy but quick taps. At set up, the heavy touches may be exaggerated by the user. Over time, the user may learn that the touch screen is even more sensitive than previously thought and that the three heavy but quick taps do not have to be so heavy to be sensed by the touchscreen and the heaviness may reduce over time. The system may learn that user has stopped exerting exaggerated pressure to indicate heavy pressure. For example, the learning algorithm may determine that all the light touches are at the proper timing intervals and proper touch level but that the heavy touches, while at the proper timing but have fallen below the previously set heavy threshold. The system may learn to lower the heavy threshold to better match the user and make the PIN input less frustrating.

In addition, the system may learn that the touch pressure may vary over time, For example, touch pressure first thing in a morning may be lower than the touch pressure in the middle of the day, By collecting enough data, the data may be analyzed by the system to determine that what is a heavy touch in the morning is different than a heavy touch in the afternoon. A time base 126 may provide one or more clock signals to the device 100. The time base 126 may include a system clock used for timing data transfers between the memory 112 and the processor 110. Other clock signals may be derived from the time base 126 including a counter 128 used to index entry of digits of the PIN as discussed in more detail below. The counter 128 may have a fixed interval, such as two seconds per count or may be settable by a user to either a faster interval. A faster interval may increase the speed of entry of the PIN while a slower interval may make it easier to correctly follow the count and capture a PIN digit correctly.

A haptic device 130 may aid the user in capturing the PIN correctly. In some embodiments, the haptic device 130 may be a motor with an eccentric load that causes a vibration when activated and in other embodiments, the haptic device may be a purpose built device to provide feedback. The haptic device 130 may aid the user by providing a tactile feedback to the user either at the beginning of each count or after each count. For example, after a visual or audible announcement that a PIN is required, the PIN application 122 may start the counter 128. The feedback may be accomplished in any of several ways, including but not limited to, proactively starting the counter 128 after the visual or audible announcement, in response to a first application of pressure to the touchscreen, or after another action such as activating a hardware key. Of course, the user may be able to select the desired counter start procedure.

In an embodiment, the haptic device 130 may activate at the rate of the counter interval beginning with the start of digit capture and cease either upon release of pressure from the touchscreen 124 or sometime later. For example, the haptic device 130 may continue after the final digit is captured to prevent disclosing a total number of counts in the PIN to a bystander who may be able to detect the haptic feedback. In some embodiments, the haptic device 130 may be configured to operate at different levels, that is, to provide a lower and a higher level of tactile feedback.

The different feedback levels may be used to help differentiate between the end of one digit capture and the beginning of the next digit capture by changing the level of feedback. In one embodiment, the higher level of haptic feedback may coincide with the application of heavier pressure at the touchscreen 124. While the availability of haptic feedback may be a valuable aid to a user, there is no requirement that haptic feedback be used. For example, a user who is confident in establishing a beat may simple count out the digits between pressure changes. In yet another embodiment, an audible tick on each count may be emitted by the device 100. While this may attract attention or reveal that a PIN entry is on-going, because the change in touchscreen pressure is difficult to detect, the mere presence of an audible tick may not compromise the PIN-entry process.

Figure 3:
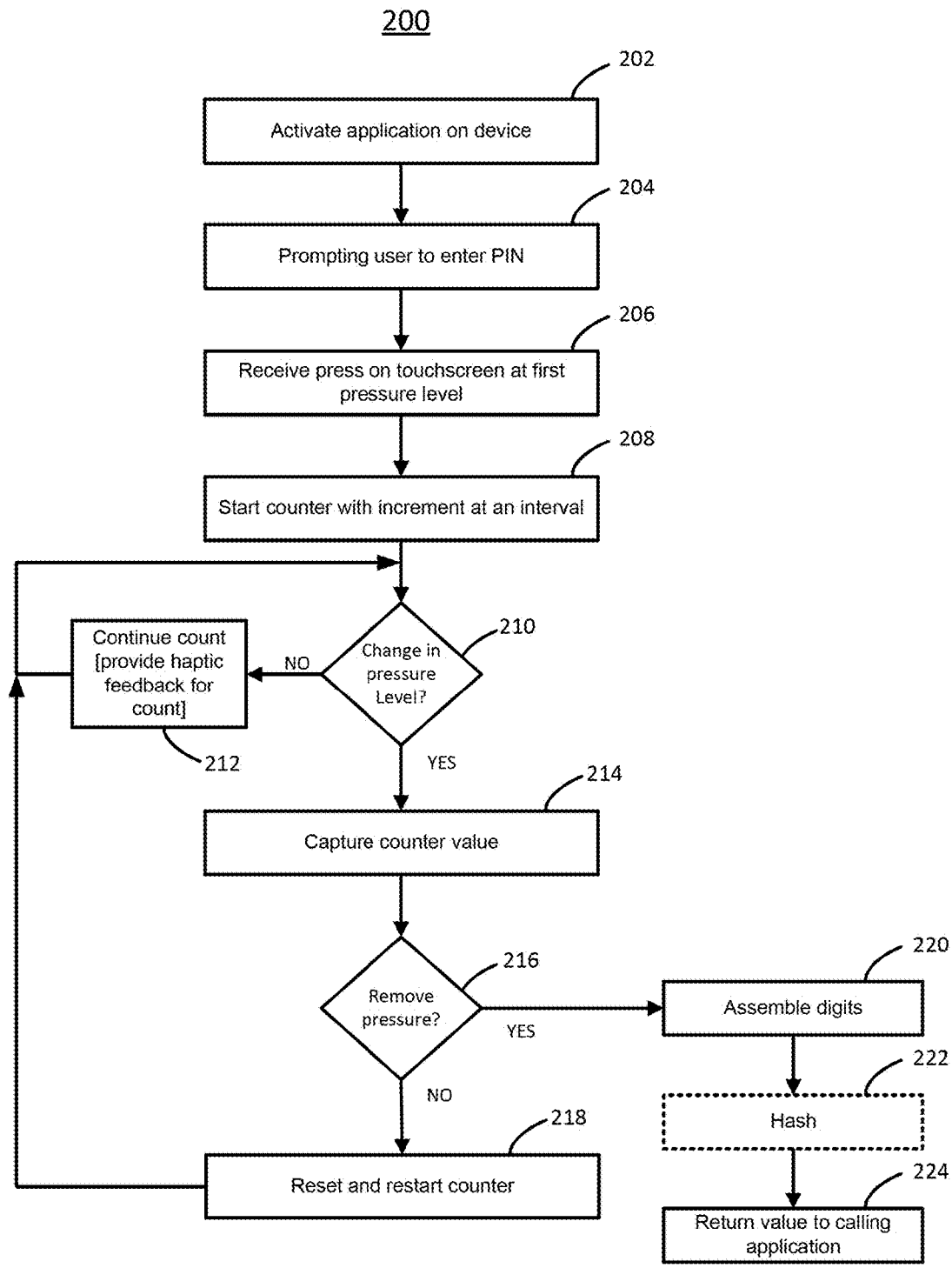
FIG. 3 is a flowchart of a method of capturing a personal identification number.

FIG. 3 is a flowchart of a method 200 of providing accessible secure data entry on a device 100 with a touchscreen 124. The method 200 may include, at block 202, activating an application 120 that requires entry of a PIN. The application 120 may have a PIN application 122 embedded within or may make an external call to a standalone PIN application 122 via an application program interface (API). The PIN entry may occur at virtually any stage of an application such as when verification of an authorized user is required At block 204, the user may be prompted to enter the PIN using the touchscreen technique. The prompt may be customized based on the type of user or environment. For example, a blind user may get an audible prompt to begin the PIN entry process while a person not needing an accommodation but who is concerned about revealing the PIN in his or her current environment may be given a readable prompt on the touchscreen 124. The prompt may be user configurable through a series of setup graphical user interfaces. For example, if a user indicates a vision impairment, default values may be set to accommodate someone that is visually impaired and these default values may be adjusted if desired. As discussed above, the beginning of the timing process associated with capturing PIN digits may begin after the prompt or after an indicator that the user is ready to begin. At this time haptic feedback, if any, may be initiated.

The device 100 may receive a press on the touchscreen 124 at block 206 at a particular pressure level. The touchscreen 124 may determine if the pressure level is considered heavy or light. In the embodiment where the user defined the pressure levels, the current received pressure may be compared to the stored pressure and if the current received pressure is over a threshold, it may be considered heavy and if the pressure is under a threshold, it may be considered light. There is no preferred initial pressure level and in an embodiment, the pressure level may not be proscribed, but is simply accepted as input with an expectation that a change to the other pressure level will be forthcoming. In this exemplary embodiment, at block 208, the counter 128 may be started at the initial press of the touchscreen 124 with a predetermined interval between counts. As described above, the interval may be pre-set or may set by a user to an individual preference. For example, some users may prefer a cadence matching a favorite song in order to keep track of the count for the individual digits.

At block 210, for the purpose of determining when one touch has ended and another touch has begun, the counter 128 may continue to increment as the touchscreen 124 is monitored for a change in pressure level. If no change is observed, the 'no' branch is taken to block 212 and the counter 128 may continue to increment. When a change in touch pressure is detected at block 210, execution may continue at block 214 where the value of the counter may be captured and stored in a buffer. A determination may be made at block 216 whether the press of the touchscreen 124 has been removed. If not, execution may continue at block 218 where the counter 128 may be reset and restarted. The counter 128 may be restarted on the same interval. Execution may then continue at block 210 as described above. When, at block 216, the pressure has been removed from the touchscreen 124 indicating that the PIN entry has been completed, the 'yes' branch may be followed to block 220.

At block 220, the captured digits may be assembled into the PIN by reading the successive digits from the buffer.

Figure 4:
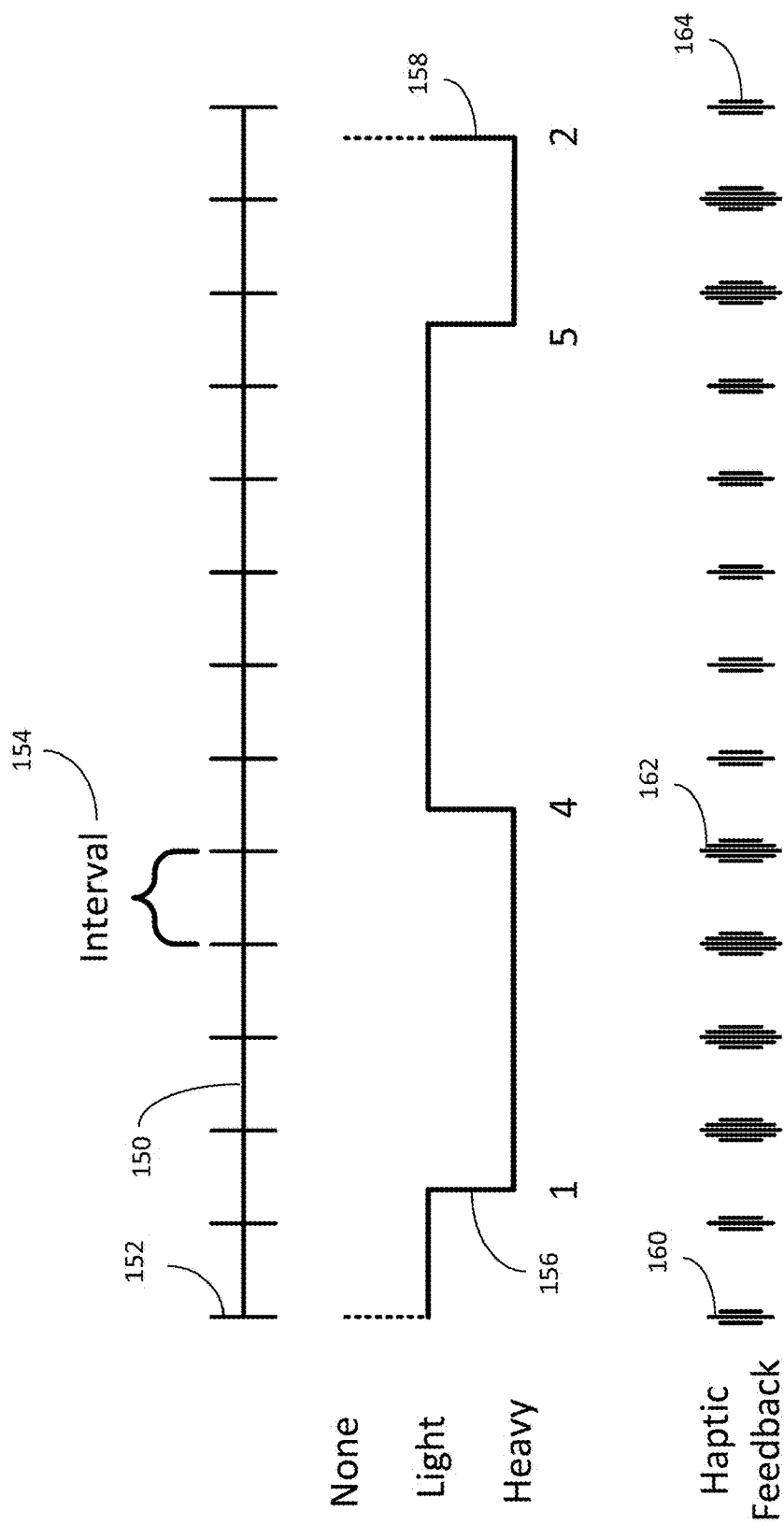
FIG. 4 is a timeline illustrating PIN digit capture.

Turning briefly to FIG. 4, a timeline 150 may illustrate the concept of PIN digit capture described above. As illustrated by the dashed initial portion of trace 156, the press may be observed even before the finger or stylus reaches the touchscreen 124. The timeline 150 begins at an initial count 152 of zero and continues at an interval 154. In the illustration, a light touch is initially applied to the touchscreen 124. When the first pressure change is detected, the counter value is 1. That digit "1" may be captured and stored in a buffer, the counter value reset, and the counter 128 restarted. The next pressure change is observed with a counter value of 4 following four intervals. The following digit is determined at a second transition with a counter value of 5 and when pressure is released at 158, the counter value is 2. The PIN may then be assembled with a final value of 1452. In contrast to a soft keypad, because the user's finger or stylus does not need to translate across the touchscreen 124 but merely change pressure, it is virtually impossible for an observer to deduce the PIN by simply watching the capture process. Even if a change in pressure could be reliably discerned, the need for the observer to also determine the counter interval and corresponding counter values makes stealing a PIN much more difficult compared to a standard keypad entry or assistive technology.

Also illustrated in FIG. 4 is an exemplary illustration of haptic feedback, if used. As shown, the haptic feedback corresponds to the pressure level on the touchscreen. For example, the haptic feedback level 160 indicated at the 0 and 1 count of the first digit is less than the haptic feedback level 162 indicated at counts 1-4 of the second digit. Also shown is the option to continue haptic feedback at time 164 after the release of the pressure on the touchscreen 124. While only one additional count is illustrated, the haptic feedback may continue for a random number of intervals or be padded out so that the haptic feedback always lasts for the same number of intervals. In other embodiments, the haptic feedback level may be constant so that an observer is less likely to be able to determine the PIN by listening to audible side effects of the haptic feedback.

In another embodiment, the ability of the touchscreen 124 to sense "near touch" events may further expand the capability to capture digits by adding a third level of alternative sensor values. For example, hovering may be another input option that may be sensed by the touchscreen 124 and the input values may be "hover", "light touch" and "heavy touch" all of which may be defined by the user or for each user.

Returning to FIG. 3, the PIN may optionally be hashed at block 222. Hashing may provide a level of security in that the PIN is not sent in the clear to the calling application. Since the calling application 120 has the value of the PIN and/or hash, a correct hash value may be accepted at the application 120 as if the original PIN were sent.

At block 224, the PIN value may be returned to the application 120 and the application 120 may determine whether to accept the PIN and how to proceed. For example, if the PIN is off by one element (light touch, hard touch, short duration, long duration, etc.) of numerous elements, different feedback may be provided to the user than if all the elements were not matches to the stored elements. Similarly, the feedback may be communicated when the system understands the PIN entry to be complete. In one example, a user may still be entering a PIN but the system may understand the PIN entry to be complete (and incorrect). Thus, the feedback may indicate to a user that the PIN should be entered more quickly.

The PIN value need not be restricted to four digits but may be virtually any number of digits that the application 120 requires and that can be reasonably kept track of by the user during the capture process. In general, the technique described above lends itself to the entry of numerical digits, but may be used to capture alpha characters as well. For example, the count may begin at "a" and continue through the alphabet. After a character is captured, the count may restart at "a." In another example, a second finger or stylus press may cause the count to begin at the letter "m" or count backwards from the letter "z." In this way, virtually any data may be entered using the multi-pressure sensitive touchscreen 124.

A system and method in accordance with the current disclosure has the technical effect of re-purposing of a touchscreen 124 supporting multiple pressure levels and adding a counter 128 to allow both visually impaired users and those users in a suspect environment to securely enter a PIN or passcode.

A system and method in accordance with the current disclosure benefits users by providing a secure method to enter a PIN value when circumstances make the use of a standard keyboard or keypad undesirable or unsafe. System providers similarly benefit from a more secure end-to-end process for activating an application 120 or entering a secure environment.

The figures depict preferred embodiments for purposes of illustration only. One skilled in the art will readily recognize from the following discussion that alternative embodiments of the structures and methods illustrated herein may be employed without departing from the principles described herein Upon reading this disclosure, those of skill in the art will appreciate still additional alternative structural and functional designs for the systems and methods described herein through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the systems and methods disclosed herein without departing from the spirit and scope defined in any appended claims.

The invention claimed is:

1. A method of entering a personal identification number (PIN), the method comprising:
    activating an application on a smartphone with a touchscreen supporting multi-pressure input;
    prompting, via the application, a user of the smartphone to enter the PIN;
    receiving a press on the touchscreen at a first pressure level;
    i) starting a counter having a counter value incremented a count interval;
    ii) determining a change in the pressure level to a second pressure level of the press after a number of count intervals;
    iii) entering a PIN digit corresponding to the counter value at the change in pressure level;
    repeating i-iii until all PIN digits are captured, with a final PIN digit captured upon release of the press on the touchscreen, wherein repeating i-iii includes alternating between a first haptic feedback level and a second haptic feedback level upon starting the count and at each determined change in pressure level corresponding to each separate PIN digit; and
    responsive to correct PIN entry, setting the smartphone to an authorized state relative to the application.

2. The method of claim 1, further comprising providing a haptic feedback at each count interval.

3. The method of claim 1, wherein the first haptic feedback level and the second haptic feedback level are settings received via a touchscreen of the smartphone.

4. The method of claim 1, wherein the count interval is predetermined.

5. The method of claim 1, wherein the count Interval is a setting received via a touchscreen of the smartphone.

6. The method of claim 1, further comprising activating, via the application, an application program interface (API) that exposes a PIN entry function for capturing the PIN, the PIN entry function supporting steps i-iii and the final digit capture and returns the PIN to the application.

7. The method of claim 6, wherein the PIN is returned to the application via a secure communication channel in the smartphone.

8. The method of claim 1, wherein a PIN entry function supporting steps i-iii and the final digit capture is integral to the application.

9. A system for capturing secure data comprising:
    a touchscreen sensitive to multiple pressure levels;
    a time base;
    a memory storing executable instructions and data; and
    a processor coupled to the touchscreen, the time base, and the memory; the processor executing instructions that cause to:
    i) receive a press on the touchscreen at first pressure level;
    responsive to receiving the press:
        access the time base to activate a counter, the counter incrementing a time interval;
    ii) increment the counter until a change in the press of the touchscreen to a second pressure level is detected;
    iii) responsive to detecting the change to the second pressure level, record a value of the counter, reset and restart the counter;
    continue detecting changes between pressure levels, at each pressure level change record the value of the counter and reset and restart the counter until the press on the touchscreen is removed;
    responsive to the press on the touchscreen being removed, record a final value of the counter and assemble the recorded count values into an order set of numbers; and
    communicate the ordered set of numbers to an application requiring the ordered set of numbers.

10. The system of claim 9, further comprising a secure channel used to communicate the ordered set of numbers to the application.

11. The system of claim 9, further comprising a haptic device that causes a vibration when active, wherein the processor causes the haptic device to activate at each increment of the counter.

12. The system of claim 11, wherein the processor causes the haptic device to have a first vibration level when the press on the touchscreen is at the first pressure level and to have a second vibration level when the press on the touchscreen is at the second pressure level.

13. The system of claim 9, wherein the time base is a system clock.

* * * * *